United States Patent
Stratton

(10) Patent No.: US 9,851,719 B2
(45) Date of Patent: Dec. 26, 2017

(54) SYSTEM AND METHOD FOR EXECUTING A PROJECT PLAN AT WORKSITE

(71) Applicant: Caterpillar Inc., Peoria, IL (US)

(72) Inventor: Kenneth L. Stratton, Dunlap, IL (US)

(73) Assignee: Caterpillar Inc., Peoria, IL (US)

(*) Notice: Subject to any disclaimer, the term of this patent is extended or adjusted under 35 U.S.C. 154(b) by 0 days.

(21) Appl. No.: 15/168,724

(22) Filed: May 31, 2016

(65) Prior Publication Data
US 2017/0344011 A1    Nov. 30, 2017

(51) Int. Cl.
| | | |
|---|---|---|
| *B07C 5/02* | (2006.01) | |
| *G05D 1/02* | (2006.01) | |
| *G05D 1/00* | (2006.01) | |
| *E02F 9/20* | (2006.01) | |
| *E02F 9/26* | (2006.01) | |

(52) U.S. Cl.
CPC ........... *G05D 1/0219* (2013.01); *E02F 9/205* (2013.01); *E02F 9/262* (2013.01); *G05D 1/0088* (2013.01); *G05D 1/0276* (2013.01)

(58) Field of Classification Search
CPC ........ G05D 1/0219; E02F 3/432; E02F 9/267; E02F 1/00; E02D 19/18; B03B 9/06; B07C 5/02
See application file for complete search history.

(56) References Cited

U.S. PATENT DOCUMENTS

| | | | | |
|---|---|---|---|---|
| 5,100,537 | A | * 3/1992 | Krause | ...................... B03B 9/06 209/2 |
| 5,590,791 | A | * 1/1997 | Gschweitl | ................. B07C 5/02 209/577 |
| 5,875,854 | A | * 3/1999 | Yamamoto | .............. E02F 3/432 172/4.5 |
| 8,306,836 | B2 | 11/2012 | Nichols et al. | |
| 8,340,990 | B2 | 12/2012 | Cline et al. | |
| 8,364,353 | B2 | * 1/2013 | Kiegerl | ..................... E02F 1/00 700/245 |
| 2002/0112381 | A1 | * 8/2002 | Mizutani | ................. E02D 19/18 37/352 |
| 2005/0038579 | A1 | * 2/2005 | Lewis | ..................... E02F 9/267 701/31.4 |
| 2009/0198505 | A1 | 8/2009 | Gipps et al. | |
| 2012/0232942 | A1 | 9/2012 | Gaug et al. | |
| 2014/0180444 | A1 | 6/2014 | Edara et al. | |

* cited by examiner

*Primary Examiner* — Yuri Kan

(57) ABSTRACT

The disclosure relates to method for executing project plan at worksite including project location. The method includes receiving, the project plan and analyzing, by the control unit, the project plan to determine excavation locations and dumping locations. The method further includes determining properties of material associated with the excavation locations and the dumping locations. The method includes determining, by the control unit, if properties of material associated with the excavation locations are matching with the properties of material present at the dumping locations, and if properties of materials present at the excavation locations are matching with the properties of materials present at the dumping locations, by combining materials present at the excavation locations with the materials present at the dumping locations. The method includes instructing the machine to excavate materials.

16 Claims, 4 Drawing Sheets

SYSTEM AND METHOD FOR EXECUTING A PROJECT PLAN AT WORKSITE

TECHNICAL FIELD

The present disclosure relates to a method for executing a project plan at a worksite using a machine.

BACKGROUND

Typically, earthmoving operations at the worksite includes digging of material from a location at the worksite, transporting from a dug location and dumping dug material at a dumping location or a processing location. The earthmoving operation may include planning a project and an operational plan for machines operating at the worksite. The operational planning for the machines may include operations such as digging, loading, hauling, scraping, stripping, loading, spreading, excavating, grading, and dumping at the worksite. The operational planning for the machines may further include operational sequences of the machines, deployment of the machines at the worksite and managing the machines at the worksite.

The earthmoving plan may include digging or excavation process at the worksite. The location at the worksite may be moved according to the project plan. Material collected due to the digging process may be disposed by filling moving the dug materials to other locations at the worksite or outside of the worksite. Many times, the project plan may not provide information about dumping locations for the collected material produced due to the excavation process. The excavated material may include rock, ore, sand or soil, and any other material present at the project location. In addition, the project plan may not include properties of material for dumping the excavated material at particular locations at the worksite. If material with varying properties is dumped at the worksite, it may cause long term performance problems due to varying material properties (for example if the density of the material is not consistent with the surrounding material, then dips or potholes can result). Varying material properties can also cause environmental imbalance due to non-compatibility of properties of the material dumped at the worksite with the material upon which the excavated material is dumped. Thus, dumping or disposal of the excavated material based on the properties of excavated material may be considered to be an important aspect for complying with environmental standards and maintaining eco-friendly environment at the worksite.

U.S. Pat. No. 8,306,836 (hereinafter referred as the '836 patent) relates to a computer implemented method and computer system for management of materials on a construction site. The '836 patent discloses a cost scenario for moving material with a vehicle pool. A status of a project which uses the material is then determined. A report is generated which identifies a vehicle of the vehicle pool and defines a load of the material which is to be moved by the vehicle from a first location to a second location. However, the material moved from the first location to the second location in the '836 patent does not match properties of the material before moving the material from the first location to the second location.

SUMMARY OF THE DISCLOSURE

A method for executing a project plan at a worksite is disclosed. The method comprises receiving the project plan, which includes an initial layout and a final layout. Then the method analyzes the project plan to determine excavation locations and dumping locations at the worksite, determines properties of material associated with the excavation locations and the dumping locations based on the initial layout, and determines if properties of material associated with the excavation locations are matching with the properties of material associated with the dumping locations based on the final layout.

Next, the method determines if properties of material associated with the excavation locations are matching with the properties of material associated with the dumping locations, by combining material associated with the excavation locations with the material associated with the dumping locations. Then the method provides instructions to the machine to excavate material from the excavation locations, when properties of material associated with the excavation locations are matching with the properties of material associated with the dumping locations, by combining material associated with the excavation locations with the material associated with the dumping locations. Finally, instructions are provided to the machine to dump the excavated materials at the dumping locations, based on the final layout of the project location.

DETAILED DESCRIPTION

Figure 1:
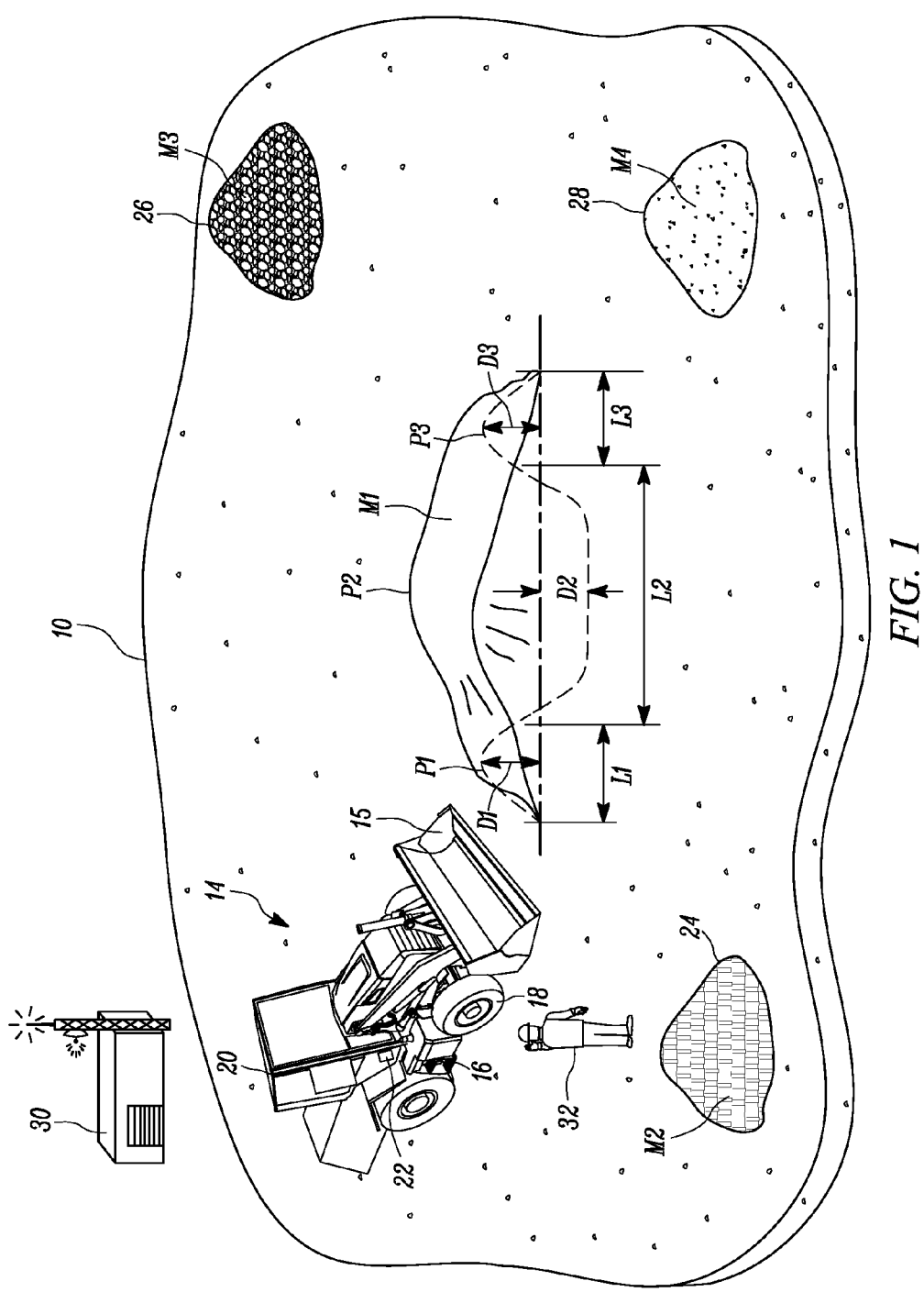
FIG. 1 is a diagrammatic view of a worksite having a project location, according to the present disclosure.

FIG. 1 illustrates a diagrammatic view of a worksite 10 including a project location 12, according to the present disclosure. The worksite 10 further includes a machine 14, for operating at the worksite 10. In the illustrated FIG. 1, the machine 14 includes an excavator machine like, a wheel loader. Although the illustrated FIG. 1 shows the machine 14, it is to be understood that the worksite 10 may include more than one machine. Alternatively, the machine 14 may be any excavator machine including, but not limited to, a shovel, a dozer, a track type tractor, a, motor grader, a wheel tractor scraper, and so on. The machine 14 includes a frame 16. A power source (not shown) is provided on the frame 16 of the machine 14. The power source may be any power source known in the art such as an internal combustion engine, an electric motor, power storage device like batteries and a hybrid engine. The power source is configured to provide power to the machine 14 for operational and mobility requirements. The machine 14 includes a set of ground engaging members 18 such as wheels or track. The ground engaging members 18 are configured to provide mobility to the machine 14. The machine 14 also includes a drivetrain (not shown) coupled to the power source and the ground engaging members 18. The drivetrain may include a transmission system having one or more gears, shafts, differentials, torque convertor, hydraulic pump or motor and so on. The drivetrain may be configured to transmit motive power from the power source to the ground engaging members 18.

The machine 14 includes one or more implements 15 and associated components pivotally coupled to the frame 16 of the machine 14. It should be noted that the machine 14 may include any other implement as per system requirements. In an example, the implement 15 may include a bucket, blade, scraper, or any other such implement known to one of skilled in the art or a combination thereof. The implement 15 is configured for performing tasks such as earthmoving, excavation, digging, and the like. In an example, the implement 15 may be controlled electrically, mechanically, hydraulically, pneumatically or by a combination thereof. The machine 14 also includes an operator cabin 20 provided on the frame 16 of the machine 14. The operator cabin 20 includes an operator interface (not shown). The operator interface may include one or more input devices like pedals, steering, joystick, knobs, levers, switches, display devices and so on. The input device may be adapted for operating and controlling the implement 15 at front and rear end of the machine 14. The machine 14 further includes a control unit 22. The control unit 22 is configured to control operation of the machine 14 based on a project plan in the project location 12 at the worksite 10. The control unit 22 may be located at a remote control station 30. In another aspect of the current disclosure, the machine 14 may be configured to be operated from the remote control station 30 by the operator. Further, the operator may be located at the remote control station 30. Control commands may be issued over a communications medium or any other suitable communications network as is known in the art such as 4G LTE or 802.11. Further, the machine 14 may be configured to operate autonomously according to a set of instructions. The instructions may be located on a controller onboard the machine 14, a neighboring machine, or may be issued by the control unit 22 over the communications medium.

The worksite 10 includes the project location 12. The 'project location' 12 as used herein refers to a 'location' at the worksite 10 at which the project plan needs to be executed. The 'project plan' as used herein refers to a plan or a blueprint including details of the project, such as excavation details, dumping details at the project location 12, properties of material available at the project location 12 and at various locations at the worksite 10. In an example, the excavation details may include depth to which the excavation is to be carried out, contour or shape of the project location 12 after the excavation or completion of the project at the project location 12.

The project plan may include details of excavation to be carried out and the filling details at the project location 12. In an example, the project plan may identify excavation at a location 'P2' of the project location 12 for a depth of 'D2' from a ground surface 'G' and for a length of 'L2'. Also, the project plan may identify filling of the material at a location 'P1' and a location 'P3' for a height of 'D1' and 'D3' respectively from the ground surface 'G' for a length of 'L1' and 'L3' respectively.

The project plan may further include materials present at various locations at the worksite 10 including at the project location 12. The project location 12 includes a first kind of material 'M1'. Further, the worksite 10 includes a second kind of material 'M2' at a second location 24, a third kind of material 'M3' at a third location 26, and a forth kind of material 'M4' at a fourth location 28. Properties of the first kind of material 'M1', the second kind of material 'M2', the third kind of material 'M3' and the fourth kind of material 'M4' may be similar or distinct. In an example, the details of the material available at the worksite 10 and their locations may be available at the remote control station 30 in a data repository (not shown). An operator of the machine 14 and a supervisor 32 at the worksite 10 may communicate with the remote control station 30 for assistance during operation at the worksite 10.

Figure 2:
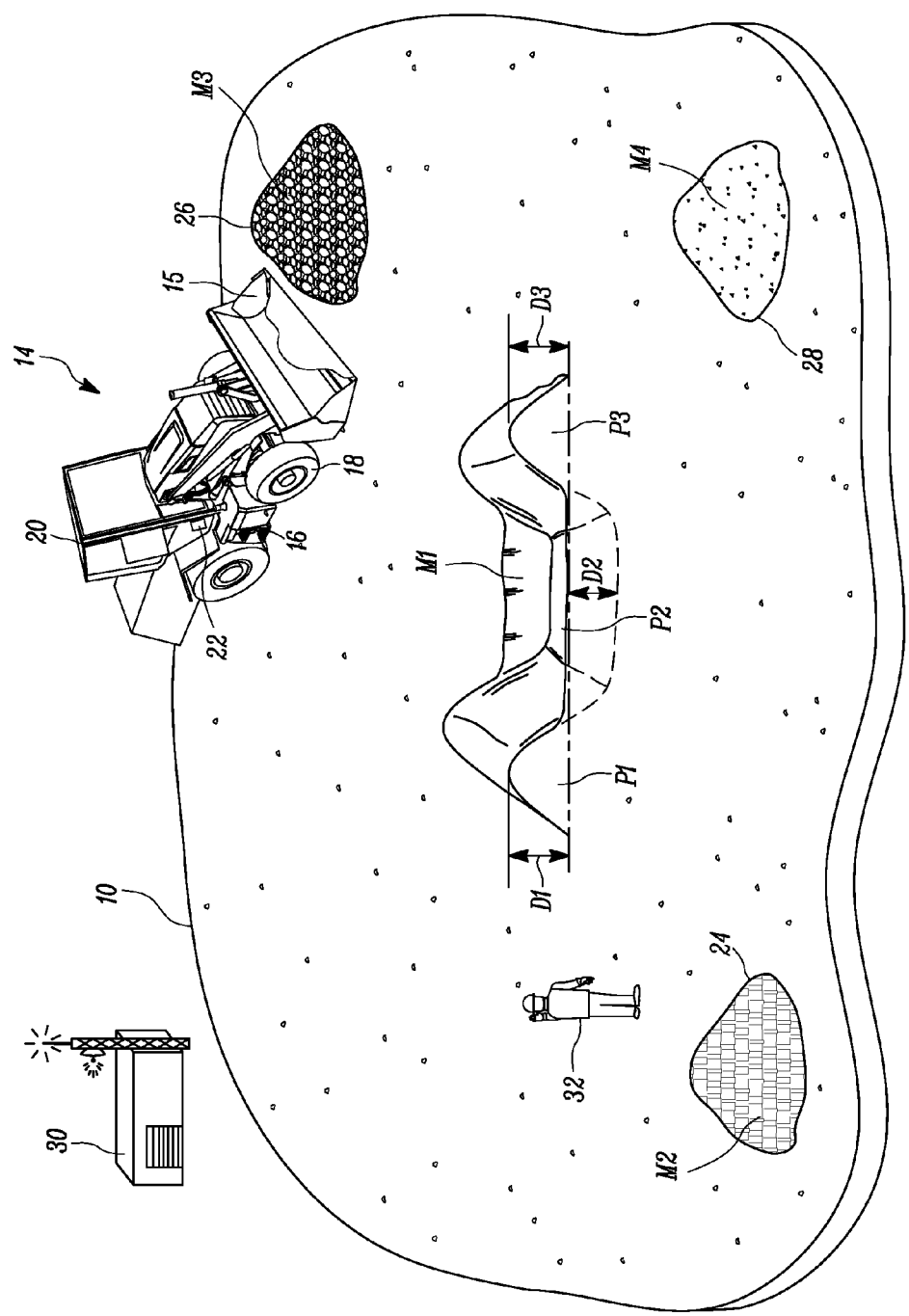
FIG. 2 is a diagrammatic view of the worksite including the project location excavated based on a project plan.

FIG. 2 illustrates a diagrammatic view of the worksite 10 including the project location 12 excavated based on the project plan. In the illustrated embodiment, the machine 14 is manually operated at the worksite 10. The project plan for the project location 12 includes an excavation of the project location 12 at the location 'P2' and dumping of material at the project locations 'P1' and 'P3'. The excavation at the location 'P2' and the dumping of material at the project location 'P1' and the location 'P3' is based on the project plan provided to an operator (not shown) of the machine 14. The project plan may include details of material also referred as "resources" available at the worksite 10. The material available at the worksite 10 may include similar or dissimilar properties. In an example, the properties may be based on physical state of the materials. Further, if the materials are in a physical state as solid, the properties may include, but not limited to, weight, size, density, shape, color, angularity/roundness, moisture, clay content, viscosity, mineralogy, and hardness.

In the illustrated FIG. 2, the first kind of material 'M1', the second kind of material 'M2', the third kind of material 'M3' and the fourth kind of material 'M4' are available at the worksite 10 and they may possess distinct materials. The project plan may include the details such as quantity and properties of the first kind of material 'M1', the second kind of material 'M2', the third kind of material 'M3' and also the material to be dumped at the location 'P1' and the location 'P3' at the project location 12. The operator of the machine 14 has to operate based on the project plan, by excavating the location 'P2' from the project location 12, and by dumping matching material as per the project plan at the location 'P1' and the location 'P3'. Initially, as shown in the FIG. 1, the project location 12 may include the first kind of material 'M1'. However, as per the project plan the location 'P1', the location 'P2' and the location 'P3' includes distinct material after completion of excavation and dumping operations at the project location 12 for complying with the project plan.

Further, FIG. 2 depicts matching of material present at the one or more excavating locations with material present at the one or more dumping locations, if the properties of the material present at the one or more excavating location does not match with the properties of the material present at the one or more dumping locations is illustrated.

In an example, the project plan may include the project location 12. The project plan for the project location 12 is required to be excavated and dumped with following specification.

a. At the location 'P1' and the location 'P3', dumping of material having a property of minimum quantity of 90 is to be carried out.

b. At the location 'P2', excavation of material is to be carried out. The material property at the location 'P2' is 70.

c. The worksite 10 includes variety of material such as, at the second location 24, at the third location 26, and at the fourth location 28.

d. The material at the second location 24 is having a property of 80.

e. The material at the third location 26 is having a property of 75. The minimum allowable property of material is 75.

f. The material at the fourth location 28 is having a property of 100. The minimum allowable property of material is 75.

With the above project plan and available resources at the project location 12 and the worksite 10, the machine 14 is required to perform the operations at the project location 12 as per the project plan. The machine 14 may start the operation stage wise. The stage wise operation may include, firstly dumping of the material at the location 'P1' of the project location 12. For dumping of the material at the location 'P1' of the project location 12, the machine 14 has to select the material which has a minimum property of 90. With the available details of the resources at the worksite 10, the machine 14 may select the material present at the fourth location 28 which has a property of 100. Thus, the material from the fourth location 28 of the worksite 10 is excavated to fill in at the location 'P1' of the project location 12. The location 'P1' is filled with material excavated from the fourth location 28 for a height of 'D1' as per the project plan.

At a second stage, the machine 14 has to dig the location 'P2' of the project location 12 for a depth of 'D2'. The excavated material is required to be dumped at a suitable location at which the property of the excavated material matches with properties of the material present at the dumping location at the worksite 10. The machine 14 performs the excavation operation at the location 'P2' for a depth of 'D2'. The machine 14 has to determine a suitable location at the worksite 10 for dumping the excavated material from the location 'P2'. In order to determine the suitable location, the machine 14 receives information from the control unit 22 of the machine 14 to identify a suitable location at the worksite 10 based on the project plan. The control unit 22 determines that there are no suitable location present at the worksite 10 and communicates non availability of the location at the worksite 10 for dumping of the material excavated from the location 'P2'. In this scenario, the machine 14 of the machine 14 requests for computing data of the resources to determine possibility of obtaining the material having the property suitable for dumping. The control unit 22 receives a request from the machine 14 to determine any possibility of obtaining the material property at the worksite 10 for dumping the excavated material at the worksite 10. Since the third location 26 has a material having minimum allowable property of 75, the material to be dumped at the third location 26 must possess the material property of 75. In order to obtain the material having a property of 75, the control unit 22 instructs the machine 14 to mix the material excavated from the location 'P2' with the material available at the fourth location 28. The proportion of the material mixed may include 25 units of the material having property of 70 from the location 'P2' and 5 units of the material having the property of 100 from the fourth location 28. Hence, by mixing the materials from both the location 'P2' and the fourth location 28, a material having property of 75 may be obtained. Thus, the excavated material from the location 'P2' is converted to a material having a property of 75. The material obtained by mixing may be dumped at the third location 26 having the minimum allowable property of 75.

At a third stage, the location 'P3' of the project location 12 needs dumping of material having a property of 90. With the available resources at the worksite 10, the control unit 22 of the machine 14 commands the machine 14 to dig material from the fourth location 28 for dumping at the location 'P3' of the project location 12 for a height of 'D3' from the ground surface 'G'.

Further, as the material at the fourth location 28 is dug and used for filling the location 'P1' and the location 'P2', the fourth location 28 may required to be filled in order to maintain balance of material at the worksite 10. The machine 14 requests the control unit 22 for obtaining information pertaining to material available at the worksite 10 for filling the fourth location 28. The control unit 22 determines that the second location 24 at the worksite 10 includes a material having property of 80 which is allowable to be refilled at the fourth location 28 of the worksite 10 which requires a minimum allowable property of 75. Thus, the material from the second location 24 is used to refill the fourth location 28.

Figure 3:
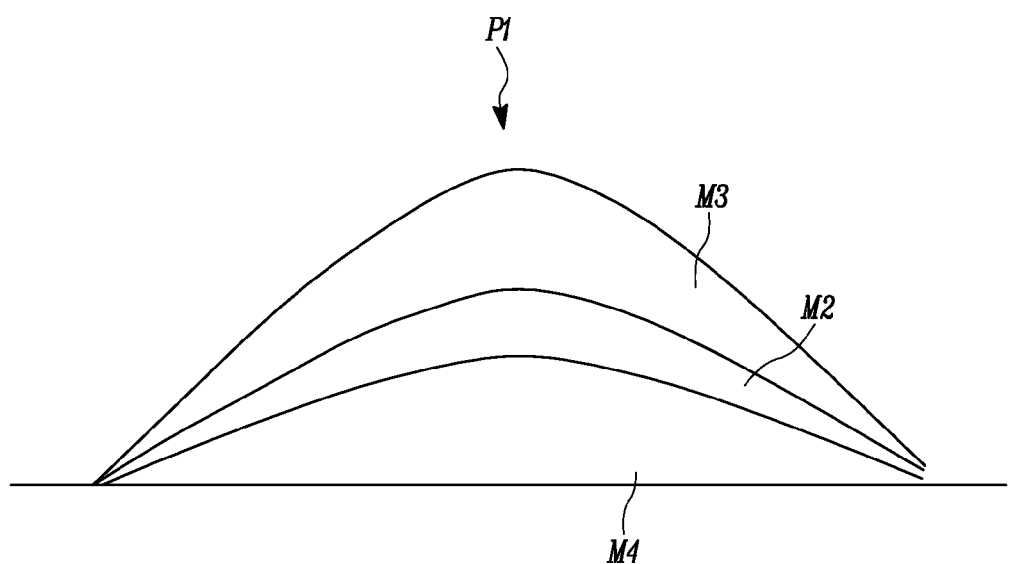
FIG. 3 is a diagrammatic view of a dumping location according to one aspect of the current disclosure.

In one aspect of the current disclosure, materials may be combined into a homogeneous mixture such that the dumped material has the desired material properties such as depicted in FIG. 2. In another aspect of the current disclosure, materials may be combined in a stratified manner such that that dumped material has the desired material properties such as depicted in FIG. 3.

Figure 4:
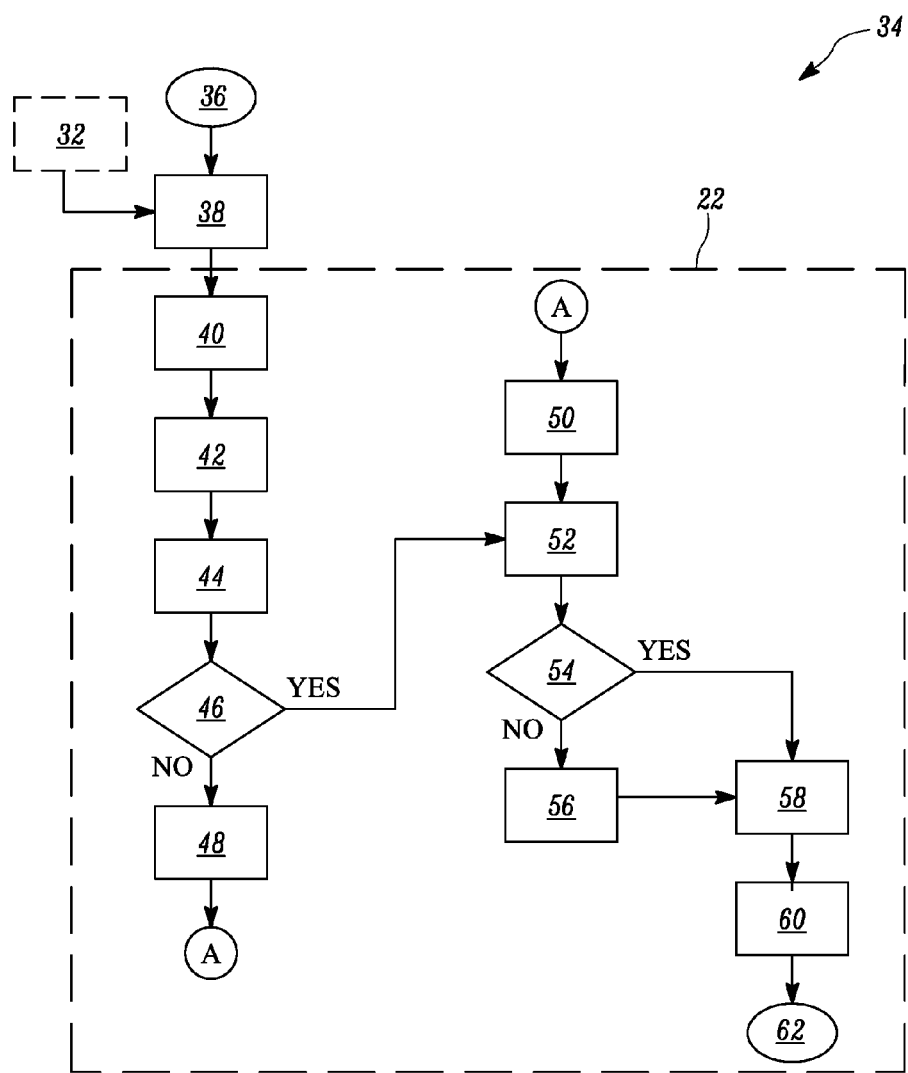
FIG. 4 is a method flowchart for executing a project plan at the worksite including the project location.

FIG. 4 illustrates a flowchart for a method 34 for the project plan at the worksite 10 including the project location 12, according to the present disclosure. The method 34 is initiated at step 36. Before starting of the operations at the worksite 10 by the machine 14, the operator or the supervisor 32 located at the worksite 10 may require the project plan for executing the project plan at the worksite 10. At step 38, a project plan is developed based on a requirement of a customer. In an example, the project plan may be developed by the supervisor 32. The project plan includes the initial layout and the final layout of the project location 12. After the development of the project plan, the project plan may be handed over to the operator of the machine 14 or the supervisor 32 present at the worksite 10 for executing the project plan. In an example, the operator of the machine 14 may input details of the project plan to the control unit 22 of the machine 14.

At step 40, the control unit 22 receives the details of the project plan. The machine 14 in the illustrated embodiment is the excavator machine 14 since the project plan requires an excavation and dumping cycles. At step 42, the control unit 22 after receiving the details of the project plan analyzes the details inputted by the operator to determine one or more excavation locations and one or more dumping locations at the worksite 10 based on the project plan. With reference to the illustrated FIG. 2, the one or more excavation locations and the one or more dumping locations may include the project location 12 having the first kind of material M1, and the second location 24, the third location 26 and the fourth location 28 having the second kind of material M2, the third kind of material M3 and the fourth kind of M4 respectively. Once the control unit 22 determines that one or more excavation locations and the one or more dumping locations at the worksite 10, the control unit 22 of the machine 14 is configured to determine properties of material associated with the one or more excavation locations and the one or more dumping locations based on the initial layout of the project plan at step 44.

In the illustrated embodiment, the material properties at the locations including the project location 12 and the material properties located at the second location 24, the third location 26, and the fourth location 28 may be similar or dissimilar. At step 46, the control unit 22 is configured to determine if the properties of materials present at the one or more excavation locations are matching with the properties of material present at the one or more dumping location based on the final layout of the project location 12. At step 48, the control unit 22 is configured to communicate with the operator or the machine 14 to combine the material of one or more excavation material with the one or more dumping material.

Further, at step 46, if the control unit 22 determines that properties of the materials present at the one or more excavation locations are matching with the properties of the material present at the one or more dumping location, then the control unit 22 instructs the operator or the machine 14 to excavate material from the one or more excavation locations.

At step 50, the control unit 22 is configured to determine if the properties of materials present at the one or more excavation locations are matching with the properties of material present at the one or more dumping locations by combining or mixing the materials of one or more excavation location with the materials of one or more dumping location. The mixing of the material is carried out using the machine 14 or any other process known in the art.

At step 52, the control unit 22 is configured to instruct the operator or the machine 14 to excavate material from the one or more excavation locations, when properties of material associated with the one or more excavation locations are matching with the properties of material associated with the one or more dumping locations, by combining material associated with the one or more excavation locations with the material associated with the one or more dumping locations.

At step 54, the control unit 22 is configured to determine if the machine 14 is dumping the excavated material at a designated or correct dumping location. If machine 14 is controlled by an operator, the control unit 22 may determine that the operator is tending to dump the excavated material at an unauthorized dumping location, the control unit 22 at step 56 is configured to generate a warning signal to the operator for stopping the dumping operation at the unauthorized dumping location. In an example, the warning signal may be in the form of an alarm or an indication of light at the dashboard or display of the machine 14 or a warning display at a control panel of the machine 14. The operator may seek an approval from the supervisor 32 for dumping at the required location. The machine 14 may be configured with proximity sensors and sensors such as but not limited to temperature sensors to distinguish the properties of materials before dumping at the dumping locations. In addition, the machine 14 may be configured with a plurality of image capturing devices integrated with the sensors for determining the unauthorized dumping of the material.

At step 58, the supervisor 32 instructs the operator of the machine 14 to dump the excavated material at the required location. At step 60, the machine 14 dumps the excavated material at the required location. At step 62, the supervisor 32 determines that if the project location 12 is excavated and dumped with material based on the final layout of the project plan.

In another, embodiment, the remote control station 30 may perform the method 34 for executing the project plan at the worksite 10. The remote control station 30 may be in electronic communication with the control unit 22 of the machine 14. The remote control station 30 may communicate with the control unit 22 of the machine 14 to control operation of the machine 14 based on the project plan in the project location 12 at the worksite 10. Further, the project plan developed by the supervisor 32 may be pre-fed into the data repository of the remote control station 30. The remote control station 30 may instruct the control unit 22 of the machine 14 for executing the project plan. The remote control station 30 may determine via the control unit 22 of the machine 14, if the project location 12 is excavated and dumped with material based on the final layout of the project plan as developed by the supervisor 32.

INDUSTRIAL APPLICABILITY

The present disclosure herein relates to the method 34 for executing the project plan at the worksite 10 including the project location 12. The method 34 may be advantageous for a novice operator as the method 34 indicates a warning generation if the novice operator tends to dump the excavated material at an unauthorized location at the worksite 10. In addition, the project plan provides an optimized path and sequential operations for performing the operations at the worksite 10.

Further, the method 34 of the present disclosure may improve efficiency and productivity of the operator since the method 34 considers properties of materials before dumping of the excavated material at the worksite 10. The method 34 also helps in improving quality of the project performed at the worksite 10 as the properties of the material or resources at the worksite 10 are not altered.

What is claimed is:

1. A method for executing a project plan at a worksite by a machine having an implement configured for earthmoving, the method comprising:
   receiving, by a control unit, the project plan, the project plan including an initial layout and a final layout;
   analyzing, by the control unit, the project plan to determine excavation locations and dumping locations at the worksite;
   determining, by the control unit, properties of material associated with the excavation locations and the dumping locations based on the initial layout;
   determining, by the control unit, if properties of material associated with the excavation locations are matching with the properties of material associated with the dumping locations based on the final layout;
   determining, by the control unit, if properties of material associated with the excavation locations are matching with the properties of material associated with the dumping locations, by combining material associated with the excavation locations with the material associated with the dumping locations;
   providing instructions to the machine to excavate material from the excavation locations, when properties of material associated with the excavation locations are matching with the properties of material associated with the dumping locations, by combining material associated with the excavation locations with the material associated with the dumping locations; and
   providing instructions to the machine to dump the excavated materials at the dumping locations, based on the final layout.

2. The method of claim 1, wherein the machine is controlled by an operator.

3. The method of claim 2, wherein the operator is located at a remote control station.

4. The method of claim 1, wherein the machine operates autonomously according to a set of instructions.

5. The method of claim 1, wherein the material is combined homogeneously.

6. The method of claim 1, wherein the material is combined in a stratified manner.

7. The method of claim 1, wherein the control unit is located on the machine.

8. The method of claim 1, wherein the control unit is located at the remote control station.

9. A system for executing a project plan at a worksite, the system comprising:
   a machine having an implement configured for earthmoving; and
   a controller configured to:
   receive the project plan, the project plan including an initial layout and a final layout;
   analyze the project plan to determine excavation locations and dumping locations at the worksite;
   determine properties of material associated with the excavation locations and the dumping locations based on the initial layout;
   determine if properties of material associated with the excavation locations are matching with the properties of material associated with the dumping locations based on the final layout;
   determine if properties of material associated with the excavation locations are matching with the properties of material associated with the dumping locations, by combining material associated with the excavation locations with the material associated with the dumping locations;
   provide instructions to the machine to excavate material from the excavation locations, when properties of material associated with the excavation locations are matching with the properties of material associated with the dumping locations, by combining material associated with the excavation locations with the material associated with the dumping locations; and
   provide instructions to the machine to dump the excavated materials at the dumping locations, based on the final layout.

10. The system of claim 9, wherein the machine is controlled by an operator.

11. The system of claim 10, wherein the operator is located at a remote control station, the remote control station being controllably connected to the machine via a communication medium.

12. The system of claim 9, wherein the machine operates autonomously according to a set of instructions.

13. The system of claim 9, wherein the material is combined homogeneously.

14. The system of claim 9, wherein the material is combined in a stratified manner.

15. The system of claim 9, wherein the controller is located on the machine.

16. The system of claim 9, wherein the controller is located at the remote control station.

\* \* \* \* \*